United States Patent [19]

Iwata et al.

[11] 4,346,932
[45] Aug. 31, 1982

[54] HINGE DEVICE FOR AN OPENABLE AUTOMOBILE ROOF

[75] Inventors: Hidefumi Iwata, Koganei; Yoshimasa Tuchiya, Sayama; Toshiharu Iidaka, Funabashi, all of Japan

[73] Assignees: Kokusan Kinzoku Kogyo Kabushiki Kaisha, Tokyo; Nissan Motor Co., Ltd., Yokohama, both of Japan

[21] Appl. No.: 178,097

[22] Filed: Aug. 14, 1980

[30] Foreign Application Priority Data

Aug. 16, 1979 [JP] Japan ............................... 54-103560

[51] Int. Cl.$^3$ ............................................. B60J 7/18
[52] U.S. Cl. .................................... 296/216; 296/218
[58] Field of Search ....................... 296/216, 217, 218; 16/128 B, 172, 174

[56] References Cited

U.S. PATENT DOCUMENTS

| 797,185 | 8/1905 | Diehl | 16/172 |
|---|---|---|---|
| 2,138,816 | 12/1938 | Holt et al. | 189/69 |
| 2,799,890 | 7/1957 | Stavich | 16/172 |
| 3,924,294 | 12/1975 | Thaler | 16/174 |
| 3,955,848 | 5/1976 | Lutz et al. | 296/137 B |
| 4,005,901 | 2/1977 | Lutke | 16/172 |

FOREIGN PATENT DOCUMENTS

| 504004 | 8/1930 | Fed. Rep. of Germany . |
| 2234151 | 4/1974 | France . |
| 2234152 | 4/1974 | France . |
| 2347223 | 3/1977 | France . |
| 2370602 | 10/1977 | France . |

Primary Examiner—Joseph F. Peters, Jr.
Assistant Examiner—John A. Carroll
Attorney, Agent, or Firm—Balogh, Osann, Kramer, Dvorak, Genova & Traub

[57] ABSTRACT

A hinge device is provided for an openable automobile roof having a detachable lid. The device includes a hinge housing at an edge portion of the opening in the automobile roof panel, a linear passage formed in the hinge housing, a guide portion projected in front of the entrance to the linear passage, a hinge tongue attached to the lid at its front edge, a linear fitting part formed on the hinge tongue and adapted to fit the passage, and a stopper part formed also on the hinge tongue and adapted to abut the guide portion when the lid is placed at the closing position.

3 Claims, 6 Drawing Figures ced detachably while the rear end of the lid 3 is secured detachably and tiltably to the rear edge 1r of the roof opening by a locking means L. It is possible to tilt the lid 3 thereby to ventilate the room of the automobile and, if necessary, to detach the lid 3 from the roof opening 2 to fully open the latter.

HINGE DEVICE FOR AN OPENABLE AUTOMOBILE ROOF

BACKGROUND OF THE INVENTION

The present invention relates to an improvement in a hinge device for detachable and openable roof for automobiles.

In the conventional hinge device, the passage of the hinge housing is difficult to process because it has an arcuate form and an extremely small width and because it is necessary to process a hinge tongue to confirm precisely with the arcuate passage. For these reasons, it has been necessary to make the hinge tongue with a sufficient resiliency. Therefore, it is difficult to maintain the major surface of the lid flush with the major surface of the roof panel because of insufficient rigidity of the hinge tongue. This poses a problem concerning the attaching precision of the lid, and tends thereby to degrade the commercial value of the product. In addition, the arcuate form of the passage imposes a resistance against the sliding motion and, since it gives some difficulty in aligning the hinge tongue with the entrance of the passage, it is quite troublesome to attach and detach the lid. Furthermore, the hinge tongue is liable to lose its resiliency and impose problems concerning the mechanical strength.

SUMMARY OF THE INVENTION

Under these circumstances, the present invention aims at overcoming the above-described problem of the prior art by providing a hinge device for an openable automobile roof in which the housing formed at the front edge of the roof opening is made to have a linear form and the fitting part of the hinge tongue provided at the front end of the lid is also made to have also a linear form, so as to facilitate the attaching and detaching of the lid to and from the roof opening, i.e. the alignment of the hinge tongue with the entrance of the passage while preserving a sufficiently high degree mechanical strength.

BRIEF DESCRIPTION OF THE DRAWINGS

The invention will be fully described hereinunder through a specific embodiment of the invention with reference to the accompanying drawings in which.

DETAILED DESCRIPTION OF THE EMBODIMENT

Figure 1:
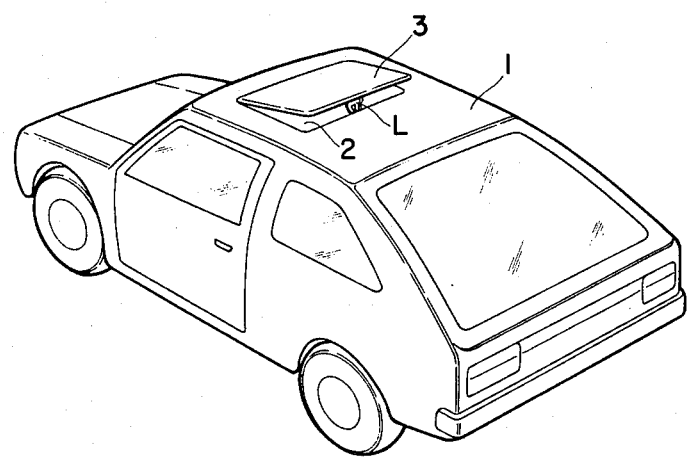
FIG. 1 is a perspective view of an automobile having an openable roof to which the present invention is applied.
Figure 2:
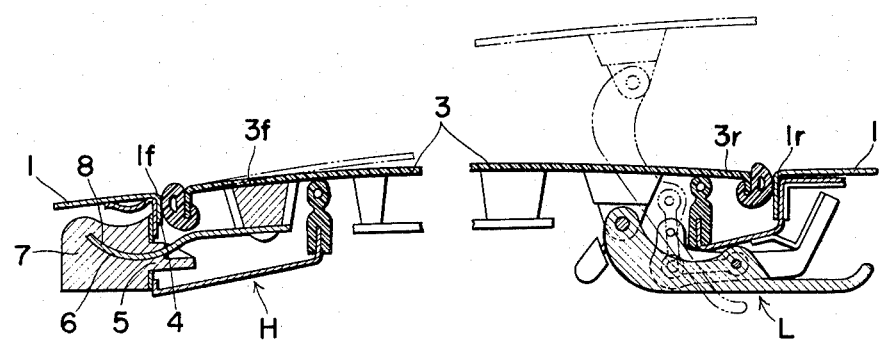
FIG. 2 is a sectional view of a conventional device for opening and closing the roof.

Referring to FIG. 1 showing a typical example of openable roof of automobile, an opening 2 is formed in the roof panel 1, and lid 3 for opening and closing the roof opening 2 is hinged at its front end to the front end edge 1f of the roof opening by means of a hinge device FIG. 2 shows a conventional hinge device H of the openable roof of the type described above. More specifically, this hinge device has a stationary hinge housing 7 having an arcuate passage 6 fixed to the inlet 5 opening in an upright wall 4 of the front edge of the roof opening 1f, while a flexible hinge tongue 8 projected from the front edge 3f of the lid 3 is made to have an arcuate form substantially equal to that of the arcuate passage 6 so that the hinge tongue 8 is fitted to and withdrawn from the arcuate passage 6 to attach and detach the lid 3 to and from the openable roof.

Figure 3:
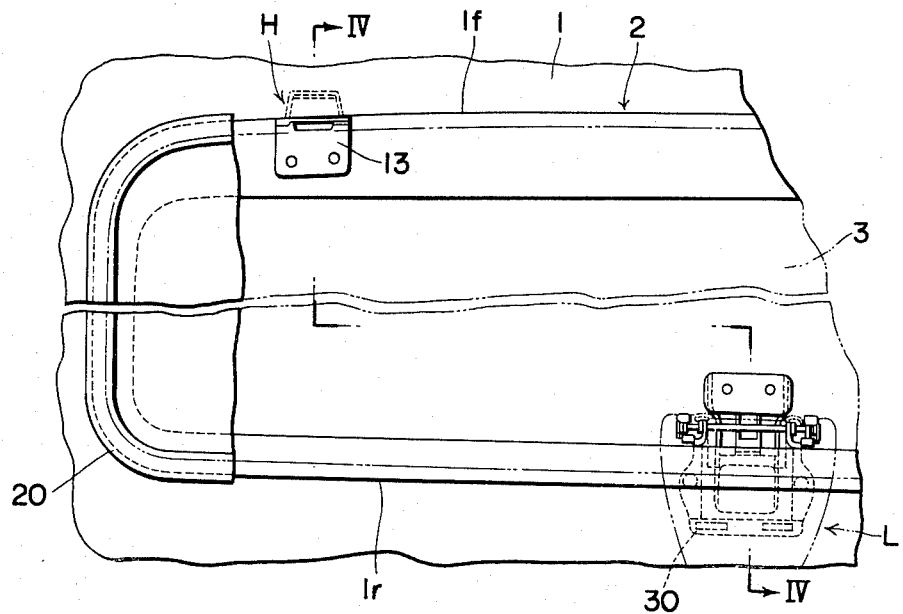
FIG. 3 is a plan view of a part of the automobile roof provided with a hinge device constructed in accordance with the invention.
Figure 4:
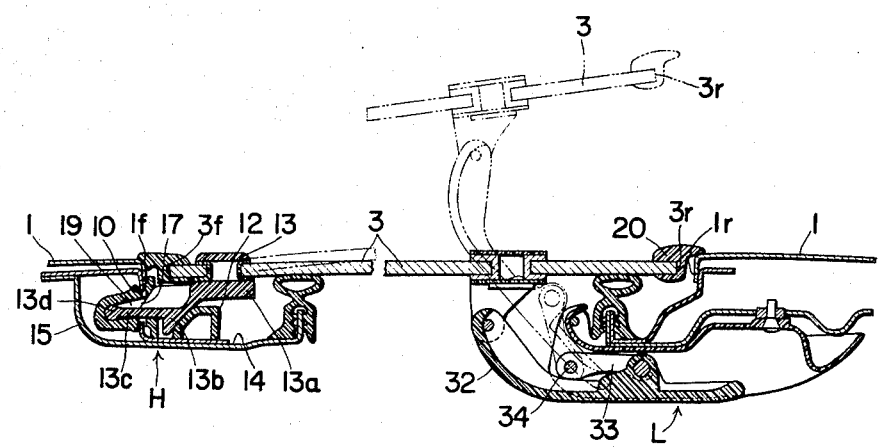
FIG. 4 is a sectional view taken along the line IV—IV of FIG. 3.

Referring to FIGS. 3 and 4, a lid 3 for opening and closing the roof opening 2 formed in the roof panel 1 is detachably secured to the edges of the roof opening 2 formed in a roof panel 1, by means of a hinge device H and a locking device L. In this embodiment, the hinge device H for detachably securing the front end 3f of the lid 3 to the front edge 1f of the roof opening is constituted by a hinge housing 10 formed at the front edge 1f of the roof opening, a guide portion 12 positioned at the entrance 17 of the hinge housing 10, and a hinge tongue 13 projected from the front edge 3f of the lid 3.

Figure 5:
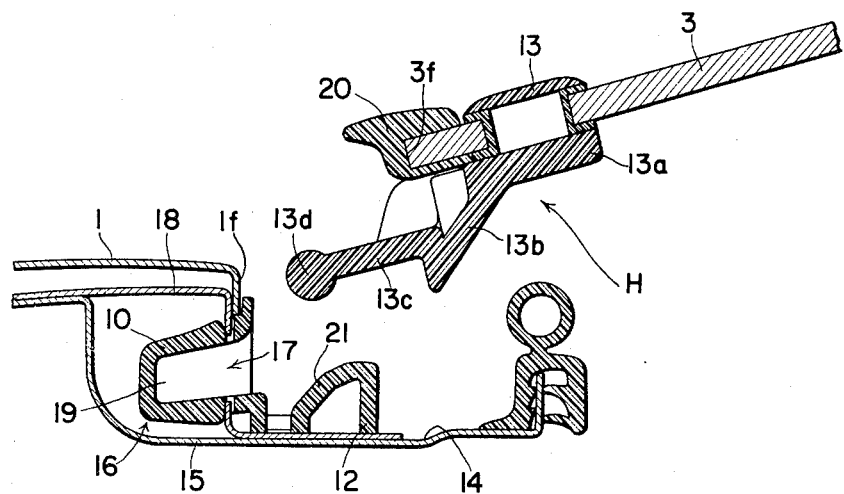
FIG. 5 is an exploded sectional view of the hinge device of FIG. 4.
Figure 6:
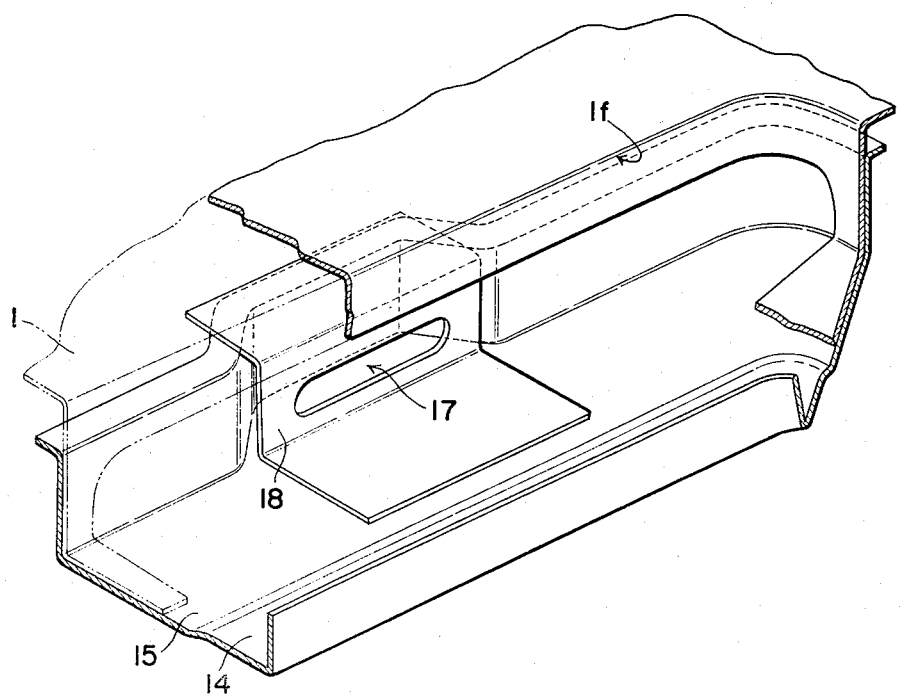
FIG. 6 is a perspective view of the construction of the roof portion to which the hinge housing is attached.

The hinge housing 10 is constituted, as shown in FIGS. 4 to 6, by a recess 16 which is formed at the front side (as viewed from the front of the automobile) of a reinforcing member 15 positioned under the roof panel 1 and provided with a drip groove 14, the recess 16 being formed at a portion corresponding to the position of the hinge tongue 13 projected forward from the front edge 3f of the lid 3, a housing support panel 18 disposed at the front side of the recess 16 and provided with an entrance 17 formed therein, and a member having a substantially channel shaped cross-section and made of a synthetic resin, the member being disposed in the recess 16 and forming a substantially linear passage or dead-end recess 19.

As will be seen from FIG. 6, the upper end of the housing support panel 18 is clamped between the roof panel 1 and the reinforcing member 15, while the lower end of the same is fixed to the upper surface of the drip groove 14 of the reinforcing member 15. Also the lower part of the hinge housing 10 disposed in the recess 16 is extended from the surface of the housing support panel 18 and along the lower end of the latter in the rearward direction. A guide portion 12 is formed to project upward from this rearward extended portion. This guide portion 12 is disposed at the front side of the entrance 17 of the housing 10. The wall of the guide portion 12 adjacent to the entrance is tapered as at 21 toward the front side of the automobile.

The hinge tongue 13 is secured at its base portion 13a to the front end 3f of the lid 3 by means of screws. A stopper part 13b and a fitting part 13c are extended from the base portion 13a in the forward direction towards the front of the automobile. As shown in FIGS. 4 and 5, this stopper part 13b, which includes a flat surface, is adapted to slide on the tapered surface 21 of the guide portion 12 when the lid 3 is tilted thereby to locate the front edge 3f of the lid 3, and, in the state in which the lid 3 is fitted to the roof opening 2, serves to restrain the movement of the lid 3 in the forward and rearward directions thereby to prevent the vibration of the hinge tongue 13 and the hinge housing 10. Also, the fitting part 13c of the hinge tongue 13 is formed to have a flat shape corresponding to the linear passage 19 of the hinge housing 10. Also, an expanded portion 13d is formed at the end of the fitting part 13c so as to be closely held at the bottom of the passage 19 of the hinge housing 10 thereby to restrain the movement of the hinge tongue 13 in the forward direction of the automobile, as well as in the upward and downward directions. The expanded portion 13d has preferably a circular cross-section, as shown in FIGS. 4 and 6.

The locking device L of this embodiment is, as shown in FIG. 4, attached to the rear end 1r of the roof opening detachably and tiltably. More specifically, a base plate 30 fixed to the rear edge 1r of the rear edge of the roof opening is provided with a hook 31 which is adapted to open in the direction of movement of the lid rear end 3r, i.e. obliquely upward and forward, when the lid rear end 3r is tilted. A handle 32 rotatably carried by the lid rear end 3r which rotatably carries one end of a link 33. A shaft pin 34 projected from the other end of the link 33 is rotatably fitted in the hook portion 31. These members in combination constitute a toggle connection. At the same time, a stopper (not shown) for holding the shaft pin 34 in the hook portion 31 is carried extractably and retractably by the base plate 30. The arrangement is such that, as the above-mentioned stopper is retracted at the end of the tilting motion of the lid rear end 3r, the shaft pin 34 is disengaged from the hook portion 31. The locking device L is thus constructed. In the drawings, a reference numeral 20 denotes a protector made of rubber, resin or the like and adapted to provide a seal between the lid 3 and the roof panel 1 while protecting the peripheral edge of the lid 3.

In the described embodiment, for detaching the lid 3 from the roof opening 2, the handle 32 in the interior is rotated in the forward direction of the automobile so that the lid rear end 3r is tilted and lifted as shown by the broken line in FIG. 4 and is locked at the end of the tilting motion. Then, after withdrawing the stopper to release the shaft pin 34 from the hook portion 31, the lid 3 is pulled in the rearward direction of the automobile so that the hinge tongue 13 of the lid front end 3f is withdrawn from the hinge housing 10 to complete the detaching of the lid 3.

For attaching the lid 3 to the roof opening 2, the lid is lowered at such an inclination that the bottom side of the lid 3 is lifted, so that the expanded portion 13d of the hinge tongue 13 of the lid front end 3f is slided along the tapered surface 21 of the guide portion 12 to guide the fitting part 13c into the passage 19 through the entrance 17 of the hinge housing 10 to bring the lid front end 3f into engagement with the front edge of the roof opening 1f. The shaft pin 34 of the locking device L is forced into the hook portion 31 in this state and, thereafter, the handle 32 is rotated in the rearward direction, so that the lid rear end 3r is swung and lowered to closely fit the rear edge 1r of the roof opening to complete the attaching operation.

As has been described, according to the invention, there is provided an improved hinge device for an openable automobile roof, the roof having a lid attachable and detachable to and from the roof panel to close and open a roof opening formed in the roof panel, the hinge device being characterized in that the passage formed in the hinge housing for detachably receiving the hinge tongue projected from the front end of the lid is made to have a linear form and the fitting part of the hinge tongue is shaped to have a linear form correspondingly. At the same time, the hinge tongue is provided with a stopper portion which, during attaching and detaching of the lid, guides the fitting part of the hinge tongue to and from the hinge housing and, when the lid is fitted to close the roof opening, prevents the lid from moving in the forward and rearward direction of the automobile to avoid the unintentional detachment of the lid.

This improved hinge device offers various advantages as follows. Namely, the hinge housing and the hinge tongue can be formed comparatively easily. In addition, the hinge tongue having the flat fitting part may be formed of a non-flexible rigid material which in turn ensures sufficient strength of the hinge tongue. The alignment of the lid end with the hinge housing is facilitated thanks to the provision of the guide portion, so that the attaching and detaching of the lid is made quite easily. Finally, the expanded portion 13d formed at the end of the fitting part 13c of the hinge tongue 13 reduces the area of contact between the hinge tongue 13 and the hinge housing 10 to decrease the sliding resistance to provide a smoother and easier opening and closing motion of the lid 3, as well as attaching and detaching of the same.

What is claimed is:

1. A hinge device for an openable automobile roof having a lid portion, which comprises:
    a hinge housing formed at an edge portion of an opening in the automobile roof panel, said housing being provided at the front side thereof with an entrance and a dead end recess extending substantially horizontally with said entrance, in facing relation to said opening;
    a rigid hinge tongue attached to said lid portion and having a cross-section smaller than the recess of said housing; and
    a guide portion provided in front of said entrance and having a tapered guiding surface, for engaging said tongue, spaced apart from said entrance, and in facing relation thereto, so as to permit insertion of said tongue into the recess,
    said rigid hinge tongue having an expanded portion at its free end to snugly fit into the dead-end recess, and a stopper section to slide on said tapered guiding surface when said lid portion is in a position to close said opening in the automobile roof panel.

2. A hinge device according to claim 1, wherein said expanded portion has a circular cross-section.

3. A hinge device according to claim 1, wherein said stopper section includes a flat surface.

* * * * *